United States Patent Office 2,914,517
Patented Nov. 24, 1959

2,914,517

POLYMERIZATION OF OLEFINS TO SOLID POLYMERS

Louis Schmerling, Riverside, Ill., assignor, by mesne assignments, to Universal Oil Products Company, Des Plaines, Ill., a corporation of Delaware No Drawing. Application December 24, 1956
Serial No. 630,098

8 Claims. (Cl. 260—93.7)

This invention relates to a process for polymerizing olefinic hydrocarbons, particularly ethylene, to form the so-called "hard" polymers thereof which are useful in many of the fabricating arts, particularly for the manufacture of molded articles such as containers (bottles, bags, tubes, etc.), pipes, pliable toys, etc. and for the production of articles generally in which resinous and plastic materials are useful starting materials. More specifically, this invention concerns a process for the manufacture of high molecular weight polymerized olefin hydrocarbons, the polymerization of the olefinic monomer being effected in the presence of a particular combination of catalyst components, one of which is titanium oxide and the other components are metallic aluminum and a halide of aluminum.

It has been found that a very desirable class of polymeric olefins referred to herein as "hard" polymers may be produced by an olefin hydrocarbon polymerization process involving certain reaction conditions and a particular class of catalyst, which in combination produce the polymeric products of this invention having molecular weights substantially in excess of about 10,000 and softening points substantially above the boiling point of water, for example, in the region of from about 115° to about 140° C. and even higher. This class of hydrocarbon polymer has been particularly sought after by the plastics and resin molding industries, because of the desirable physical and structural stability of articles molded therefrom at temperatures above the boiling point of water, making the product especially adapted for use as the starting material in the fabrication of articles which are subjected to high temperatures during their use, such as articles which must be sterilized with hot water or steam (i.e., at temperatures in excess of 100° C.), and which must also possess sufficient structural rigidity at these temperatures to resist plastic deformation or resist change in shape from the original structure of the molded article after cooling. It is widely recognized that processes are now in use for polymerizing olefinic hydrocarbons for the production of polymers having stable structural properties at relatively high temperatures which approach the boiling point of water, but in many cases, such polymers undergo a permanent set when heated to temperatures in the region of 100° C. or become sufficiently soft at the latter temperature that the polymer tends to flow and the molded article tends to undergo permanent structural deformation. In contrast to such products of the prior art, the present olefin polymers maintain their shape and other structural characteristics at temperatures substantially in excess of the boiling point of water and, furthermore, are of sufficiently high softening point that the polymer may be heated at these temperatures without undergoing plastic flow deformation. Thus, such articles as combs, baby bottles, containers for infant's food, surgical tubing and other articles desired in breakage-resistant form and fabricated from the present polymeric material may be sterilized by placing the same in a steam bath or a hot water bath without suffering any substantial change in shape or size. The polymer product of this invention is also more desirable from the standpoint of hardness and toughness than polymeric olefins heretofore manufactured and possess substantially greater tensile strength and tear resistance than such products of the prior art. The improved properties in these respects are apparent in the production of molded machine parts which are subjected to mechanical wear, such as rollers, bearings, cams, gears and a multitude of other mechanical shapes and forms, the use of the present polymeric material in the fabrication of such parts providing such structures having greatly enhanced resistance to wear, breakage and mechanical distortion than solid polymers of presently produced types.

In one of its embodiments the present invention relates to a process for polymerizing an olefinic hydrocarbon which comprises contacting said hydrocarbon at a temperature of from about 25° to about 250° C. and at a pressure of from atmospheric to 100 atmospheres with a catalyst comprising a mixture of titanium dioxide, aluminum metal and a halide of aluminum.

A more specific embodiment of this invention relates to a process for producing solid ethylene polymer having a melting point above about 100° C. which comprises passing ethylene over a catalyst comprising a mixture of titanium dioxide, metallic aluminum and a halide of aluminum at a temperature of from about 25° to about 250° C. and at a pressure of from about 10 to about 100 atmospheres.

Other embodiments of this invention relating to specific aspects of the above process for polymerizing olefinic hydrocarbons will be referred to in greater detail in the following further description of the invention.

The polymeric products of this invention are essentially high molecular weight hydrocarbons formed by polymerizing or condensing olefinic hydrocarbons of lower molecular weight by means of the process referred to generally as a polymerization reaction, effected under such conditions and for a period of time sufficient to form hydrocarbons having molecular weights substantially in excess of about 10,000, generally in the region above about 30,000, depending upon the olefinic monomer utilized as the starting material. The charging stock to the present polymerization process is a mono-olefinic hydrocarbon or a mixture of hydrocarbons containing at least a small proportion of olefinic hydrocarbons having up to about 8 carbon atoms per molecule, although under certain reaction conditions, homologs of the above (i.e., higher molecular weight monomers), or recycled low molecular weight fractions of a preceding polymerization process may be employed as charging stock. Ethylene is, in general, preferred herein as starting material because of its tendency to polymerize into higher molecular weight hydrocarbons of essentially straight-chain structure, these products being particularly resistant to chemical attack (such as, oxidation by atmospheric oxygen) and are usually of higher molecular weight and tougher than the branched-chain polymeric products formed by polymerizing propylene and higher molecular weight olefin monomers. Further, 1-alkenes, such as 1-butene and 1-pentene, are especially preferred over their isomers such as 2-butene and 2-pentene. Also, the straight-chain alkenes are preferred over their branched-chain isomers such as 2-methyl-propene and 2-methyl-1-butene. The olefin monomer may be charged to the process either individually (that is, as a substantially pure olefin monomer of specific structure) or in admixture with other olefins, such as, for example, the mixture of $C_2$–$C_4$ olefins separated from the light gaseous product of a thermal cracking process or in admixture with other hydrocarbons, such as paraffins and cycloparaffins which may be present in the above referred to light gases of a thermal cracking process or formed by the dehydrogenation of paraffins. Cycloalkenes, such as cyclohexene, may also be utilized, either individually or in admixture with other olefins or other hydrocarbons. In other instances low molecular weight mono-olefins, particularly ethylene, may be mixed with a normally liquid hydrocarbon, such as cyclohexane, isopentane, or heptane to provide a reaction mixture in which the saturated hydrocarbon acts as a diluent of the olefin monomer which undergoes polymerization and is essentially the active ingredient of the hydrocarbon mixture. Such diluents may range from normally liquid materials which are relatively inert in the reaction, such as the normal paraffins, to materials which are not necessarily inert in the process, such as an aromatic hydrocarbon (e.g., benzene, toluene, xylene etc. which may undergo various side reactions with the olefin reactants or its polymer, such as mono- or polyalkylation reactions, etc.), a nitroparaffin (e.g., nitromethane, nitrobutane, etc.) and other materials which dilute the mono-olefin reactant, disperse the same in its contact with the catalyst, and thereby alter the physical properties and particularly the ultimate molecular weight of the polymer product formed during the course of the polymerization reaction.

The component of the present reaction which accounts for the production of a selective polymeric material referred to herein as "hard polymer" is the particular mixture of catalyst components comprising: titanium dioxide, aluminum metal and a halide of aluminum. The aluminum component of the catalyst mixture is preferably in the form of subdivided particles of a relatively fine state of subdivision and the aluminum halide present in the catalyst mixture may be formed in situ by passing a hydrogen halide, such as hydrogen chloride gas or the elemental halogen itself, such as chlorine gas, or a mixture of halides and/or hydrogen halides into contact with the aluminum metal, thereby forming an aluminum halide (ordinarily, the aluminum trihalide) on the surface of the metallic aluminum component of the catalyst mixture. The halide of aluminum may also be added to the catalyst mixture as such, for example, in the form of anhydrous aluminum trichloride or aluminum tribromide, or aluminum triiodide (in the order of preference), as an aluminum oxychloride, oxybromide, aluminum dibromochloride, aluminum dichlorobromide. Aluminum chloride is generally preferred herein because of its high order of effectiveness in promoting the desired polymerization reaction and further, because of its relative abundance and low cost. Additional preference is also accorded the catalysts in which the quantity of aluminum halide (depending upon the particular halide selected) is present in the catalyst mixture in an amount representing less than a 0.5 to 1 molar ratio, based upon the amount of aluminum metal present in the catalyst, the preferred catalyst mixtures containing from 0.001 to about 0.1 mole of aluminum halide per mole of aluminum in the catalyst composition. The ingredient of the catalyst composition herein referred to as titanium dioxide may be supplied from naturally occurring sources (such as the mineral, rutile, preferably heated to drive off any physically retained moisture) or the oxide may be supplied as a synthetically prepared material (for example, the oxide formed by burning pure metallic titanium in a stream of oxygen or the oxide formed by precipitating titanium hydroxide from an aqueous solution of a titanium salt, followed by heating to drive off water of crystallization and/or water of hydration from the precipitated hydroxide). The titanium dioxide is desirably present in the form of finely divided particles, for example, in a finely powdered condition, in order to increase the amount of catalytic surface available for exposure to the other components of the catalyst and to the olefinic monomer reactant. The titanium oxide desirably constitutes a major constituent of the catalyst mixture, although amounts of the oxide as low as 1 to 2% by weight of the catalyst mixture and as high as 70 to 80% by weight of said mixture may likewise be employed, but not necessarily with the same degree of effectiveness as a catalyst mixture containing from about 30 to about 60 weight percent titanium dioxide, from 0.001 to about 10% by weight of aluminum halide and from 1% to about 40% by weight of metallic aluminum.

It is believed that the effectiveness of the present catalyst in promoting the end-of-the-chain polymerization (i.e., condensation of the polymer present in the reaction mixture with the monomer undergoing reaction therewith) is dependent upon an oxidation-reduction phenomenon occurring between titanium oxide, aluminum and the aluminum halide component of the catalyst, the transfer of electrons occurring at the active catalytic centers between the particles of $TiO_2$, aluminum halide, and aluminum activating the olefin monomer molecules to condense with another monomer or with a previously formed polymer, which also has a resident double bond. It is considered essential, therefore, that the reaction mixture containing the catalyst and olefin monomer, as well as the previously formed polymer, be thoroughly agitated in order to promote the reaction and maintain the catalyst at a higher level of catalytic activity. In general, the number of active centers at which polymerization occurs in the reaction mixture increases as the intimacy of the catalytic components increases through agitation and stirring. A particularly preferred type of reaction vessel for the present polymerization process, therefore, is a stirred or rotating autoclave wherein the catalyst and olefin monomer reactants and a diluent, if desired, are intimately contacted at the present selective reaction conditions, referred to herein.

Although substantially pure metallic aluminum is preferred as the source of the aluminum component of the present catalyst mixture, various alloys of aluminum, including such typical alloys as Raney-nickel (consisting of a homogeneous alloy of aluminum and nickel) and Devarda's alloy (consisting of an alloy of copper, aluminum and zinc), as well as other alloys containing appreciable proportions of aluminum, such as aluminum-iron, aluminum-chromium and aluminum-molybdenum alloys in which the proportion of aluminum is generally greater than 25 parts per 100 parts of alloy by weight may also be utilized in the present process.

The aluminum may also be supplied to the reaction zone in the form of a tube or a pipe, (backed-up, if desired, by an iron or steel pipe to provide greater physical strength) and the reaction carried out in the aluminum tube by placing a mixture of the metal halide and titanium oxide catalyst components therein and passing the olefin reactant through the resulting packed aluminum tube at the desired reaction temperature. The tube or pipe may also have deposited thereon the aluminum halide (which may be formed on the surface of the tube or pipe, for example, by passing the hydrogen halide or halogen corresponding to the desired aluminum halide in gaseous form through the tube), together with the normally solid titanium oxide component of the catalyst. The titanium oxide component of the catalyst may be fused with the aluminum halide on the inside and/or on the outside surfaces of the tube prior to the passage of the olefin monomer through the tube to obtain the desired polymerization. Alternatively, the aluminum may be in the form of a rod or foil extending through the reactor.

Since polymerization takes place at or near the surface of the aluminum component of the catalyst, a desired characteristic, in general, of the aluminum metal is that it provides a large exposed surface area of the metal per unit mass of its weight and it is thus preferred that the aluminum-containing metal be in a relatively distended form. In thus referring to the aluminum-containing metal component of the catalyst as being in its "distended" form, it is intended that such designation indicate the physical shape or structure of the metal as being in a form having a relatively large surface area per volume of the metal in the reaction zone and that its thickness is but a fraction of its length and/or width.

Polymerization of the olefinic hydrocarbon charge stock in accordance with the present process for the production of a predominantly "hard" polymer in the presence of the specific catalyst herein provided, is effected at particular reaction conditions which are suitable for the production of such polymers, although for certain purposes "soft" polymers having the characteristics of petroleum waxes or even liquid polymers may be desired and produced as a product of the present process, albeit at other reaction conditions. Although the polymerization reaction may generally be effected at atmospheric pressure, it is usually preferred to carry out the present process at a superatmospheric pressure, up to about 3000 p.s.i., or at even higher pressures (preferably from about 100 to about 1500 p.s.i.), the preferred pressure in each instance being dependent upon the type of product desired and also upon the particular hydrocarbon charge stock. Suitable reaction temperatures for effecting the polymerization reaction of this process are temperatures within the range of from room temperature (that is, at about 20° C.) up to temperatures in the region of 300° C., and preferably, from about 80° to about 225° C. As in the case of the pressure variable, the required reaction temperature is dependent upon the character of the olefinic feed stock, the presence or absence of a diluent in the reaction mixture, and the manner of contacting the charge stock with the catalyst, as well as the type of the ultimate product desired.

It is usually desirable to carry out the polymerization in the substantial absence of air or oxygen, although hydrogen may be present in the reaction zone without seriously affecting the course of the reaction or the completeness of olefin monomer participation in the production of the product. The product formed, however, is not necessarily the same as the product obtained by polymerization of the olefin in the substantial absence of hydrogen. It is to be noted, however, that the polymer formed in the presence of hydrogen is generally of lower melting point than the product from the same monomer polymerized in the absence of hydrogen.

The solid aluminum-containing metal, the aluminum halide and the titanium oxide components of the catalyst, as well as the olefinic hydrocarbon charge stock, exist in various physical states within the reaction mixture, but it is the mutual co-action between the various components of the catalyst and the contact of the hydrocarbon feed stock with the catalytic components, and particularly the maintenance of the specific polymerization reaction conditions and their indicated co-action in the presence of each other which results in the production of the "hard" type of polymer herein desired as product. In order to obtain such co-action the olefinic hydrocarbon in gaseous or liquid phase is contacted with the catalyst at the above reaction conditions while the mixture is so agitated that the surface of the solid aluminum metal is in contact not only with the surface of the titanium oxide powder but also with the aluminum halide. Generally, the reaction is most rapid and proceeds toward completion to the greatest extent when the reaction mixture containing the solid catalytic components is rapidly stirred so as to provide a continuously exposed fresh surface of titanium oxide, aluminum halide and aluminum metal to the action of the surrounding olefin monomer. In many instances, after the initial formation of polymer within the reaction zone, additional polymer continues to form around such active centers of polymerization, possibly even without actual contact with the catalytic components. The catalyst is believed to act by virtue of reducing the activation energy required for the formation of the initial polymer, subsequent polymerization taking place by virtue of what may be referred to as a "chain reaction" involving the condensation of vicinal molecules of monomer on the end of the chain of the previously formed polymer, thereby building up long chains of polymers of extremely high molecular weight.

The present process, although particularly adapted to batch-type methods of operation for effecting the reaction, may also be conducted under continuous polymerization techniques wherein the charge stock is continuously passed through a reaction zone (such as an elongated tubular reactor containing the catalyst on the inside walls of the tube or containing the catalyst loosely packed as a porous bed within the tube), the polymer formed therein being removed by mechanical means and additional feed stock continuously supplied to the reaction zone as the polymer is removed. A modification of the batch-type process, particularly adapted to the formation of preformed, shaped polymer products, such as a container in the form of a bottle or a rectangular or cylindrical box or a complex shape which is fabricated by the usual shaping methods only with considerable difficulty comprises passing the olefin monomer in gaseous or liquid form over aluminum in the desired shape, the surface of the aluminum metal being in contact with the aluminum halide salt and the titanium oxide components of the catalyst during the polymerization process. The polymer after completion of the polymerization to the desired degree may thereafter be peeled from the surface of the aluminum mold, retaining its shape thereafter for indefinite periods of time. By such means the requirement for subsequently pressing or molding the product in a casting operation may be obviated, since the desired shape of the final product is obtained on the surface of the mold simultaneously with the polymerization reaction.

As heretofore indicated the present products are obtained only by virtue of the polymerization catalyst and the particular reaction conditions coupled therewith and utilized in the present process, the specific catalyst being capable of forming the polymer only by virtue of its composition. These "hard" polymers are normally solid materials having softening points considerably above the boiling point of water, generally above about 125° C., and in certain instances the products soften only at much higher temperatures and thus exist in the form of hornlike materials which are extremely hard but which are sufficiently elastic and tough to resist breakage and cracking even at relatively low temperatures. The refractory properties of the present polymers make them particularly suitable for use in applications where the maintenance of structural shape and contour at relatively high temperatures is particularly desirable, as in the case of reaction vessels heated to high temperatures by superheated steam. The present products are generally mixtures of polymers of various molecular weights usually averaging above about 10,000 and mostly above about 50,000, a major proportion of the product having a molecular weight within the range of 100,000 to 500,000; smaller proportions of the product may be of even higher molecular weight. The product may be separated into fractions corresponding to certain ranges of molecular weights by extracting the mixed polymer product with various solvents in which the individual fractions are selectively soluble. The lower molecular weight fractions are generally more pliable and softer than the high molecular weight polymers which are harder and more structurally rigid. Thus, a relatively low molecular weight fraction may sometimes be separated from the mixed polymer product by extracting the latter at a temperature below about 50° C. to 80° C. with an aromatic hydrocarbon such as benzene, toluene, xylene, etc., leaving a fraction of higher molecular weight material having different properties than the fraction thus extracted. As the mixed, crude polymer product is extracted with a solvent in which the low and intermediate molecular weight polymers only are soluble at an elevated temperature, the high molecular weight or "hard" polymers are left as a residue in such an extraction, the low molecular weight polymers dissolve in the solvent while it is hot and when such solution is cooled, it is generally found that the intermediate molecular weight polymers precipitate from solution while the lowest molecular weight fractions (liquid, greases, waxes, etc.) remain dissolved in the solvent. Suitable solvents of this type capable of effecting such a fractional separation are the liquid hydrocarbons and particularly the aromatic hydrocarbons, such as toluene. Other solvents which may be utilized to selectively remove other fractions, such as the low molecular weight greases and waxes from the intermediate and higher molecular weight polymers, include the low molecular weight alkyl halides, dihalides and polyhalides, for example, ethyl chloride, ethyl bromide, ethylene dichloride, ethylene dibromide, trichloropropane, chloroform, carbon tetrachloride, perfluorobutane, etc.; and aromatic halides, for example chlorobenzene and p-chlorotoluene.

This invention is further illustrated with respect to several of its specific embodiments in the following examples which are presented for illustrative purposes only with no purpose of limiting the scope necessarily in accordance therewith.

*Example I*

A solid, hard ethylene polymer was prepared in accordance with the process of this invention by polymerizing an ethylene-containing gas in a pressure autoclave containing titanium oxide, aluminum chloride and finely powdered metallic aluminum. For this purpose a mixture of 10 grams of aluminum paint pigment (finely powdered aluminum metal), 15 grams of powdered titanium oxide and 5 grams of anhydrous aluminum chloride was placed in the glass liner of a pressure autoclave and sealed into the autoclave after displacing most of the air from the inside of the reactor with nitrogen. The autoclave was then flushed twice with nitrogen and thereafter charged to a pressure of 65 atmospheres with ethylene. The autoclave was then heated slowly to 250° C. and rotated for a period of 6 hours. The maximum pressure within the autoclave during the reaction was 116 atmospheres. Following the above reaction period, after the contents of the autoclave had cooled to room temperature, the pressure was 48 atmospheres. Upon release of pressure and opening the autoclave, the product in the liner consisted of 77.5 grams of a white solid which coated the upper three-fourth of the inner liner wall and a hard, gray, solid mass in the bottom of the liner. A portion of the white solid polymer product was extracted with hot toluene in a Soxhlet extractor, the extract, on cooling depositing a gray, solid, granular material which softened at about 130-145° C. but remained gummy up to 300° C. When compressed in a Clark Press at 160-165° C. and at 10,000 p.s.i. pressure, a flexible, translucent sheet having good tensile strength was formed.

Utilizing a mixture of propylene-propane containing 75% by weight of the olefin in a process operated at otherwise similar reaction conditions, a product having a lower softening point (98° to 109° C.) is produced, the polymer also being less tough and not so hard as the polyethylene product formed at similar reaction conditions.

*Example II*

A product similar to the polymer formed in Example I, above, but produced in greater yield was prepared by heating a mixture of 10 grams of aluminum powder, 15 grams of titanium oxide and 2.5 grams of aluminum chloride at a temperature of 120-125° C. (maximum pressure, 82 atmospheres) for 3 hours at an initial ethylene pressure of 65 atmospheres. Following the above period of reaction and after cooling the autoclave to room temperature, the pressure was 26 atmospheres. The product consisted of 172 grams of hard, grayish, yellow material having a softening point of about 160° C. The polymer which was extracted from the above product with toluene in a Soxhlet extractor softened at about 140-150° C.

*Example III*

A product similar to the above, but formed in the shape of a solid sheet which was flexible, but hard was formed by heating ethylene at an initial pressure of 80 atmospheres in the presence of 3 grams of aluminum foil (in the form of a cylindrical spiral), 10 grams of titanium oxide, and 5 grams of anhydrous aluminum chloride slowly to a maximum temperature of 250° C. The maximum pressure developed during the course of the reaction was 114 atmospheres, a break in the pressure occurring at about 120° C.; the final pressure, after cooling the autoclave to room temperature, was 58 atmospheres. 83 grams of tough, polymeric product deposited on the aluminum surface was recovered.

*Example IV*

A catalytically active polymerization surface was prepared by placing an aluminum tube in a glass cylinder and passing a dilute mixture of chlorine gas and nitrogen through the tube at 50° C. for several minutes, aluminum chloride forming on the surface of the inner tube as the chlorine gas was passed through the cylinder. The aluminum chloride coated aluminum tube was thereafter packed with small pills of titanium oxide, the packed aluminum tube placed in the galss liner of a pressure autoclave, and the autoclave rotated as it was heated to a temperature of 150° C. in an atmosphere of ethylene charged into the autoclave to an initial pressure of 70 atmospheres. The maximum pressure during the course of the polymerization was 122 atmospheres and the final pressure was reduced to 42 atmospheres after cooling the autoclave following the period of reaction. 87 grams of solid polymer was recovered from the reaction mixture, the polymer surrounding the aluminum tube contained within the glass liner. The product recovered by extraction of the crude polymer product with toluene softened at a temperature of about 145° C.

I claim as my invention:

1. A process for producing a solid olefin polymer which comprises polymerizing a 1-olefin of from 2 to about 8 carbon atoms per molecule at a temperature of from about 80° to about 250° C. and at a pressure of from about 10 to about 100 atmospheres in contact with a catalyst consisting essentially of a mixture of titanium dioxide, aluminum metal and an aluminum trihalide, the titanium dioxide being in major proportion.

2. The process of claim 1 further characterized in that said 1-olefin contains up to about 5 carbon atoms per molecule.

3. The process of claim 2 further characterized in that said 1-olefin is ethylene.

4. The process of claim 2 further characterized in that said 1-olefin is propylene.

5. The process of claim 1 further characterized in that said aluminum trihalide is aluminum chloride.

6. The process of claim 1 further characterized in that said aluminum trihalide is a chloride formed by contacting metallic aluminum with a chlorine-containing gas.

7. The process of claim 1 further characterized in that said aluminum metal is in the form of powdered aluminum.

8. The process of claim 1 further characterized in that said aluminum metal is in the form of a tube of aluminum.

References Cited in the file of this patent

UNITED STATES PATENTS

| 1,877,664 | Howes | Sept. 13, 1932 |

FOREIGN PATENTS

| 534,792 | Belgium | Jan. 31, 1955 |
| 874,215 | Germany | Apr. 20, 1953 |